United States Patent
Yanagi et al.

(10) Patent No.: US 8,364,350 B2
(45) Date of Patent: Jan. 29, 2013

(54) STEERING SYSTEM FOR REAR WHEELS OF VEHICLE

(75) Inventors: Takashi Yanagi, Wako (JP); Yutaka Horiuchi, Wako (JP); Hiroaki Sasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 44 days.

(21) Appl. No.: 12/918,515

(22) PCT Filed: Feb. 10, 2009

(86) PCT No.: PCT/JP2009/052207
§ 371 (c)(1),
(2), (4) Date: Aug. 20, 2010

(87) PCT Pub. No.: WO2009/104497
PCT Pub. Date: Aug. 27, 2009

(65) Prior Publication Data
US 2010/0332083 A1    Dec. 30, 2010

(30) Foreign Application Priority Data

Feb. 22, 2008    (JP) .................................. 2008-041094

(51) Int. Cl.
*A01B 19/00*    (2006.01)
(52) U.S. Cl. ........................................................ 701/42
(58) Field of Classification Search ........................ None
See application file for complete search history.

(56) References Cited

U.S. PATENT DOCUMENTS

| | | | | |
|---|---|---|---|---|
| 4,709,775 A * | 12/1987 | Watanabe et al. | ............. | 180/233 |
| 4,893,690 A * | 1/1990 | Mori et al. | ..................... | 180/414 |
| 5,225,753 A * | 7/1993 | Koike et al. | ................... | 318/560 |
| 5,386,365 A * | 1/1995 | Nagaoka | ......................... | 701/44 |
| 5,879,061 A * | 3/1999 | Koibuchi | ....................... | 303/146 |
| 2003/0209869 A1* | 11/2003 | Kwon | ........................ | 280/86.75 |

FOREIGN PATENT DOCUMENTS

| | | |
|---|---|---|
| JP | 05-330444 | 12/1993 |
| JP | 2002-059855 | 2/2002 |

* cited by examiner

*Primary Examiner* — Thomas Tarcza
*Assistant Examiner* — Adam Alharbi
(74) *Attorney, Agent, or Firm* — Rankin, Hill & Clark LLP (57) ABSTRACT

A steering system for rear wheels of a vehicle without a dead zone in the vicinity of the steering wheel zero. The steering system includes a steering controller and control units that control the rear wheels to be steered in accordance with the steering angle of the steering wheel. The steering system performs a reduction control to provide a smaller steering control amount for the rear wheels in a range where a steering angle becomes smaller than a predetermined value, compared to a steering control amount for the rear wheels in the other ranges of the steering angle. When an angle speed of the steering angle becomes greater than a predetermined value, the steering system performs no reduction control or the reduction control with less reduced steering control amount for the rear wheels even in the range where the steering angle becomes smaller than the predetermined value.

10 Claims, 9 Drawing Sheets

STEERING SYSTEM FOR REAR WHEELS OF VEHICLE

BACKGROUND OF THE INVENTION

1. Field of the Invention

The present invention relates to a steering system for rear wheels of a vehicle that controls a toe angle depending on steering angle and steering angle speed of a steering wheel of the vehicle.

2. Description of the Related Art

Conventionally, in a vehicle such as a four-wheel vehicle, rear wheels are controlled to be orientated outward (toe-out) or inward (toe-in) relative to a vehicle traveling direction in a top plan view, so as to enhance movement property of a vehicle in accordance with a driver's driving operation.

For example, in order to cancel a camber angle, both rear wheels are controlled in a toe-in orientation so as to improve straight line vehicle stability, or both rear wheels are also controlled in a toe-in orientation at the time of braking so as to enhance driving stability of a vehicle.

In such a rear-toe control, it is possible to enhance movement performance of a vehicle by controlling a steering angle of rear wheels in accordance with a steering angle and a steering angle speed of a steering wheel handled by a driver.
[Patent Document 1] JP 05-330444 A By the way, in the case in which a steering angle of rear wheels is controlled in accordance with a steering angle and or steering angle speed of a steering wheel handled by a driver, if a control gain is increased, even very small swings of the steering wheel to the right and the left cause the rear wheels to be steered, so that the vehicle moves too sensitively, which may cause unpleasant feeling to the driver.

To counter such a phenomenon, if a dead zone is provided in the vicinity of a neutral position, i.e. a zero position of a steering angle of a steering wheel; i.e. in vicinity of the neutral position thereof, the rear wheels are not steered when driving straightly, which eliminates the above unpleasant feeling, but when the steering angle of the steering wheel passes through the neutral position at the time of turning back the steering wheel significantly, movements of the rear wheels are suddenly stopped, which also causes another unpleasant feeling.

The patent document 1 discloses a technique of 4WS (Wheels Steering) using a dead zone.

To address the above problems, the present invention has an object to provide a steering system for rear wheels of a vehicle, free from effects from a dead zone in the vicinity of a zero steering angle of a steering wheel, causing no unpleasant feeling to a driver during driving.

SUMMARY OF THE INVENTION

A steering system for rear wheels of a vehicle according to the claim 1 of the present invention is a steering system for rear wheels of a vehicle that steers the rear wheels in accordance with a steering angle of a steering wheel, and the steering system performs a reduction control to provide a smaller steering control amount for the rear wheels in a range where a steering angle becomes smaller than a predetermined value, compared to a steering control amount for the rear wheels in the other ranges of the steering angle, and when an angle speed of the steering angle becomes greater than a predetermined value, the steering system performs no reduction control or the reduction control with less reduced steering control amount for the rear wheels even in the range where the steering angle becomes smaller than the predetermined value.

The steering system according to the claim 2 further performs, in the steering system of the claim 1, the reduction control to limit a rate of change in the steering control amount for the rear wheels, in which the steering control amount becomes smaller as the steering angle becomes smaller.

The steering system according to the claim 3 further controls, in the steering system of the claim 2, the right and the left rear wheels separately.

The steering system according to the claim 3 further includes respective actuators for the right and the left rear wheels, in the steering system of the claim 2.

Since the steering system for rear wheels of a vehicle according to the claim 1 of the present invention is a steering system for rear wheels of a vehicle that steers the rear wheels in accordance with a steering angle of a steering wheel, and the steering system performs a reduction control to reduce steering control amount for the rear wheels in a range where a steering angle becomes smaller than in other ranges of the steering angle; and when an angle speed of the steering angle becomes greater, the steering system performing no reduction control or the reduction control with less reduced steering control amount for the rear wheels even in the range where the steering angle becomes smaller, the rear wheels are not steered even when the steering wheel is swung to the right and the left during running straightly, so that the steering system is free from affects from the dead zone at the time of turning back the steering wheel, thereby to prevent unpleasant feeling during driving.

Since the steering system according to the claim 2 of the present invention, in the steering system in the steering system of the claim 1, performs the reduction control to limit a rate of change in the steering control amount for the rear wheels, in which the steering control amount becomes smaller as the steering angle becomes smaller, a significant change in the steering control amount for the rear wheels can be prevented, so that it is possible to prevent unpleasant feeling due to a rapid change in the steering control amount for the rear wheels.

Since in the steering system according to the claim 3 can control the right and the left rear wheels to be steered separately, the controls as set forth in the above claims 1 and 2 and other controls for the rear wheels at the time of cornering, etc., can be performed so that various controls for the rear wheels can be realized flexibly.

Since in the steering system according to the claim 4, in the steering system of the claim 3, the right and the left rear wheels have respective actuators, the right and the left rear wheels can be controlled separately through the respective actuators.

EXPLANATION OF LETTERS OR NUMERALS

1 Automobile (vehicle)
2R, 2L Rear wheels
3 Steering wheel
120L, 120R Toe angle change units
130 Steering control ECU (steering control unit for rear wheels)
$\alpha_{TR}$, $\alpha_{TL}$ Toe angles for the rear wheels (steering control amount for rear wheels)
$\theta_H$ Steering angle
$\omega_H$ Steering angle speed (angle speed of steering angle)

DETAILED DESCRIPTION OF THE PREFERRED EMBODIMENT

Descriptions will be provided on the embodiment of the present invention.

<<Steering System 100 of Vehicle 1>>

Figure 1:
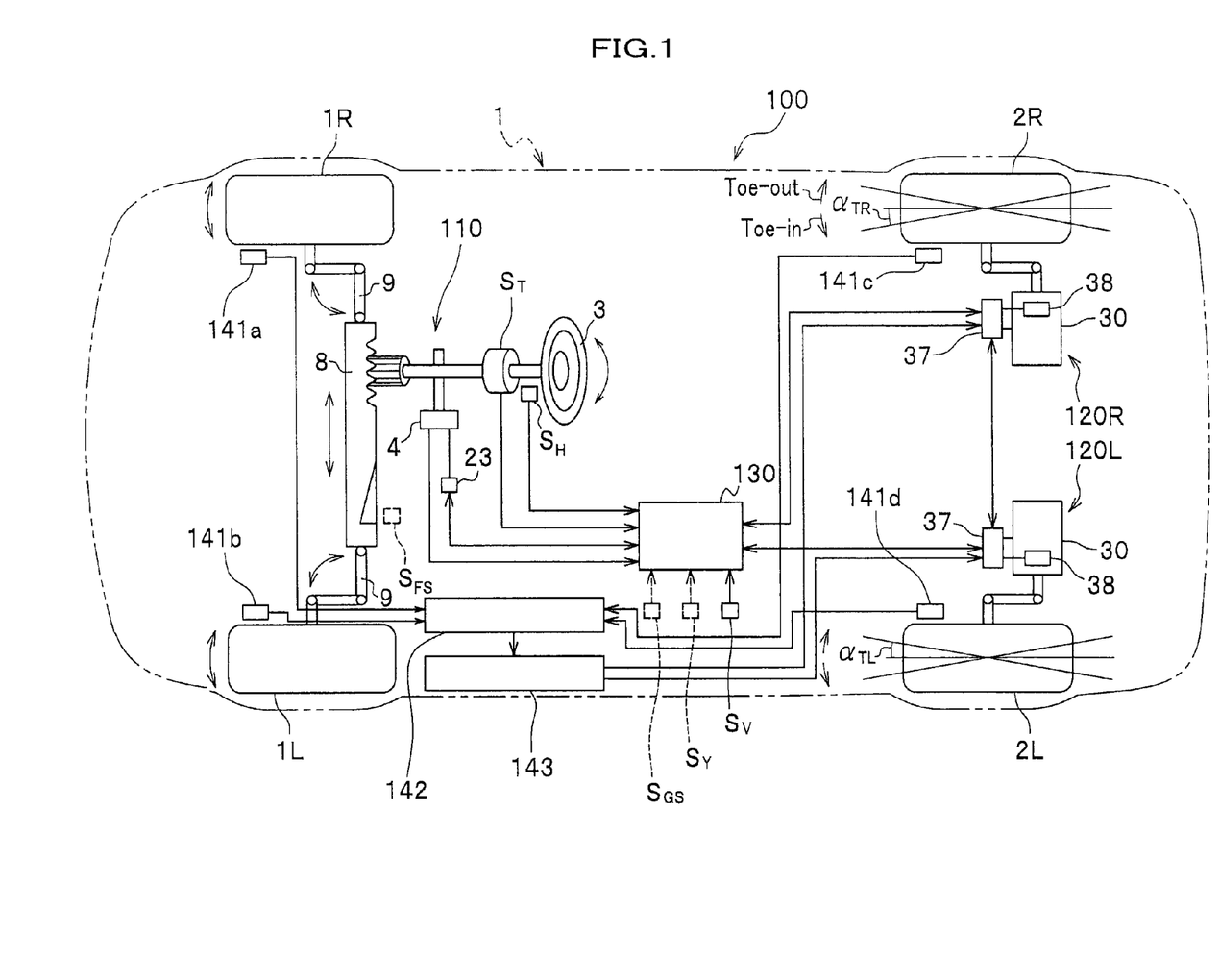
FIG. 1 is a schematic diagram in a plan view of a vehicle including a steering system according to an embodiment of the present invention.
Figure 2:
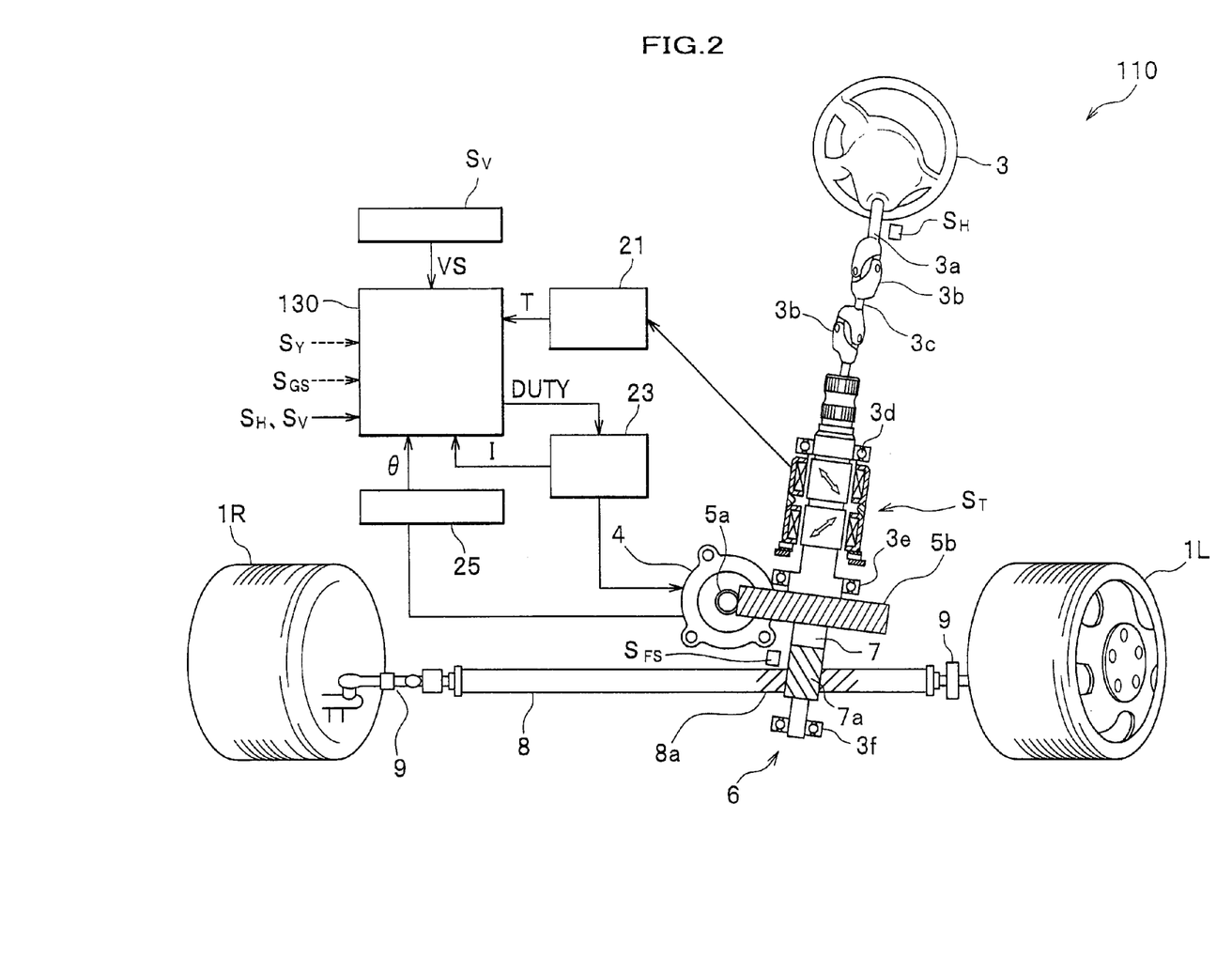
FIG. 2 is a configuration diagram of an electric power-assisted steering system included in the vehicle according to the embodiment.

FIG. 1 is a schematic diagram in a plan view of a vehicle 1 including the steering system 100 according to the embodiment of the present invention, and FIG. 2 is a configuration diagram of the electric power-assisted steering system 110 included in the vehicle 1 according to the embodiment. As shown in FIG. 1, the vehicle 1 including the steering system 100 according to the embodiment has functions to control toe angles $\alpha_{TL}$, $\alpha_{TR}$ for the rear wheels 2R, 2L in order to enhance driving stability and driving performance and the like.

For example, the steering system 100 of the vehicle 1 controls the rear wheels 2R, 2L in a toe-in orientation at the time of braking the vehicle so as to enhance straight line vehicle stability, and controls the rear wheels 2R, 2L to be straight relative to the traveling direction without providing toe-in or toe-out control on the rear wheels at the time of accelerating the vehicle so as to enhance acceleration performance. In addition, the steering system 100 of the vehicle 1 controls in a toe-out orientation either of the rear wheels 2R, 2L which comes to the inner side when cornering, and controls in a toe-in orientation the other of the rear wheels 2R, 2L which comes to the outer side when cornering, thereby to enhance cornering performance.

The steering system 100 of the vehicle 1 includes the electric power-assisted steering system 110 having a function to assist a driver to handle the steering wheel 3 (see FIG. 2), the steering controller (hereinafter also referred to as the "steering control ECU (Electronic Control Unit)") 130 for controlling the steering of the front wheels 1R, 1L and the rear wheels 2R, 2L, the toe angle change controllers (hereinafter also referred to as the "toe angle change control ECUs") 37 for controlling to change the toe angles $\alpha_{TL}$, $\alpha_{TR}$ for the rear wheels 2R, 2L, respectively, the toe angle change units 120L, 120R for changing the respective toe angles for the rear wheels 2R, 2L in accordance with the control of the toe angle change control ECUs 37, and the various sensors such as a vehicle speed sensor Sv for detecting a speed of the vehicle (i.e. vehicle speed).

As shown in FIG. 2, the electric power-assisted steering system 110 assists a driver to handle the steering wheel so as to steer the front wheels 1L, 1R by using driving force of the motor 4. The steering control ECU 130 controls the electric power-assisted steering system 110 to control the front wheels 1R, 1L. As shown in FIG. 1, the steering control ECU 130 controls the toe angle change units 120L, 120R in accordance with the vehicle speed including braking and acceleration, the steering angle $\theta_H$ and the steering angle speed $\omega_H$ of the steering wheel 3, etc.

The toe angle change units 120L, 120R change the respective toe angles $\alpha_{TL}$, $\alpha_{TR}$ for the rear wheels 2R, 2L separately in accordance with the vehicle speed, the steering angle $\theta_H$ and the steering angle speed $\omega_H$ of the steering wheel 3, etc., by using the actuator 30 as described later. The steering system 100 includes the wheel speed sensors 141a, 141b for detecting the respective rotation speeds of the front wheels 1R, 1L and the wheel speed sensors 141c, 141d for detecting the respective rotation speeds of the rear wheels 2R, 2L, the road condition difference detection unit 142 for detecting difference in the road condition between the right and the left wheels 1L, 2L and 1R, 2R, respectively when each contacting the road, and the toe angle adjustment control unit 143 for correcting and controlling the toe angles for the rear wheels 2R, 2L, respectively, depending on the road condition difference.

The wheel speed sensors 141a, 141b, 141c, 141d detect the respective rotation speeds of the front wheels 1R, 1L and the rear wheels 2R, 2L to generate wheel speed signals thereof and inputs these wheel signals to the road condition difference detection unit 142. The road condition difference detection unit 142 generates a road condition difference signal when the difference in the road condition between the right and the left wheels 1L, 1R and 2L, 2R respectively become greater than a predetermined value, and input the generated road condition difference signal to the toe angle adjustment control unit 143, and based on the road condition difference signal, the toe angle adjustment control unit 143 generates a toe angle adjustment signal and inputs this signal to the toe angle change control ECUs 37 that control the toe angles change units 120L, 120R.

Figure 8:
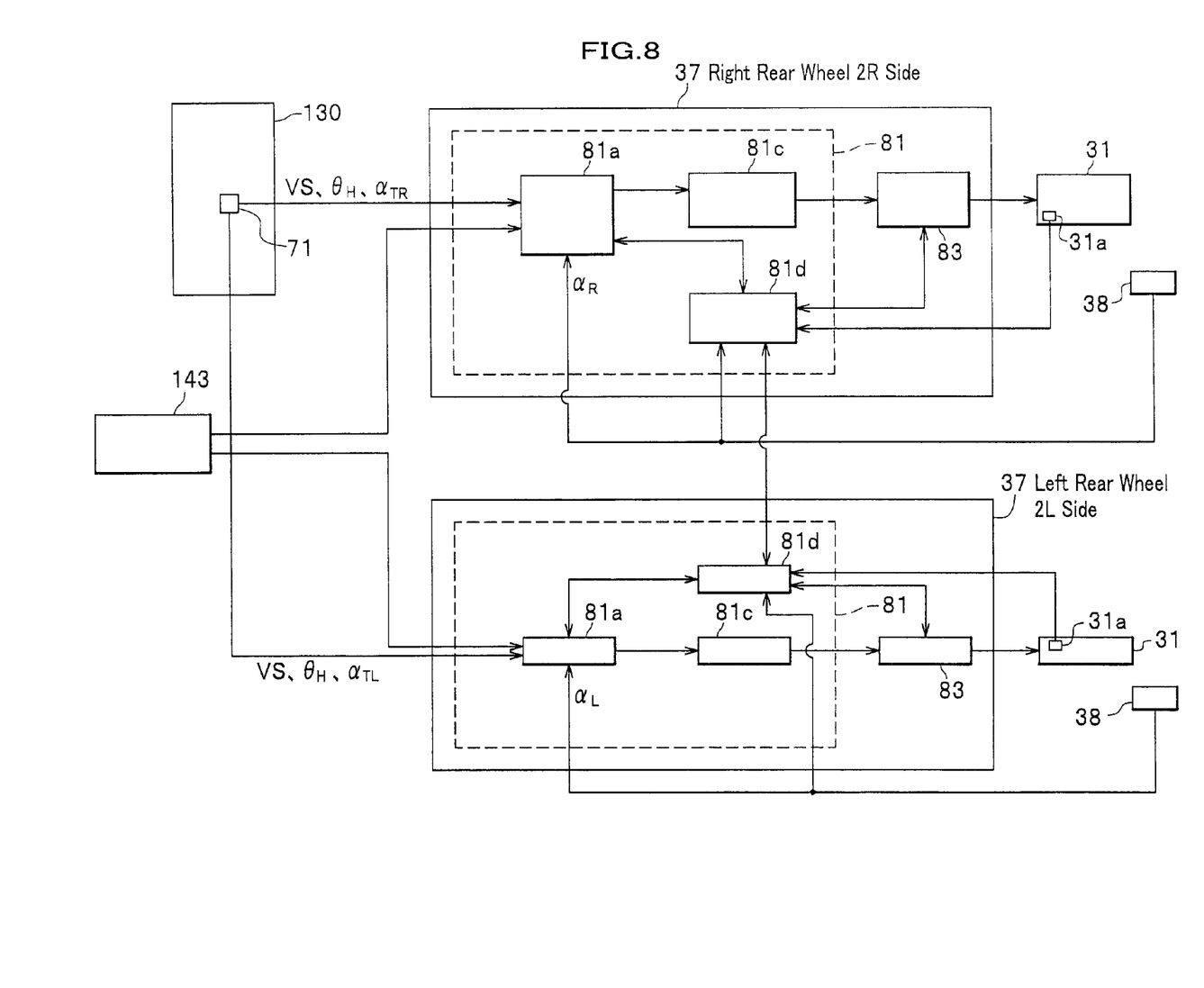
FIG. 8 is a block diagram showing control functions of the toe angle change control performed by the toe angle change units according to the present embodiment.

At this time, when the road condition difference detection unit 142 detects difference in the road condition, the toe angle adjustment control unit 143 generates a toe adjustment control signal to control either of the rear wheels which has a greater friction coefficient against the road, and inputs the generated toe angle adjustment control signal to the target current calculation unit 81a (see FIG. 8) of either of the toe angle change control ECUs 37 (see FIG. 8). Then, the target current calculation unit 81a performs a calculation to set either of the rear wheels which has a greater friction coefficient against the road to have toe-in orientation when receiving the toe angle adjustment control signal from the toe angle adjustment control unit 143. Based on the above calculation of the target current calculation unit 81a, the toe angle change control ECU 37 (see FIG. 1) controls either of the rear wheels 2R, 2L which has the greater friction coefficient against the road to have toe-in orientation.

As shown in FIG. 1, when receiving signals from the yaw rate sensor $S_Y$ that detects a yaw rate representing a rotation speed around the gravity center of the vehicle 1 and the lateral acceleration sensor $S_{GS}$ that detects an acceleration in the lateral direction (longitudinal direction in FIG. 1) of the vehicle 1, the road condition difference detection unit 142 may detect difference in the road condition (i.e. coefficient of friction on the road) between the right and the left wheels 1L, 2L and 1R, 2R by determining whether the vehicle 1 is turning outward or inward based on the direction of the yaw rate and the lateral acceleration.

Then, the toe angle adjustment control unit 143 determines that the determined outward-turning side of the vehicle 1 has a greater friction coefficient against the road, and generates a toe angle adjustment control signal to set either of the rear wheels 2R, 2L which has the greater friction coefficient to have toe-in orientation, and input the generated toe angle adjustment control signal to the target current calculation unit 81a corresponding to either of the toe angle change control 37. The vehicle speed sensor $S_V$ (see FIG. 1) detects rotation speed of an output shaft of a transmission (not shown) of the vehicle 1 as the number of pulses per unit of time, and converts the rotation speed into the vehicle speed (vehicle body speed), and then outputs a vehicle speed signal VS.

<Electric Power-Assist Steering System 110>

As shown in FIG. 2, in the electric power-assisted steering system 110, the main steering shaft 3a and the shaft 3c and the pinion shaft 7 are coupled to one another through the two universal joints (free joints) 3b. The pinion shaft 7 is supported at its upper portion, middle portion and lower portion through the bearings 3d, 3e, 3f respectively to the steering gear box 6.

In the electric power-assisted steering system 110, the pinion gear 7a at the lower end of the pinion shaft 7 is meshed with the rack gear 8a of the rack shaft 8 that reciprocately moves in the lateral direction, and the both ends of the rack shaft 8 are coupled to the right and the left wheels 1L, 1R via the tie rods 9, 9. As such, the rack shaft 8 with the rack gear 8a and the tie rods 9, 9, etc., constitute the steering mechanism of the front wheels 1L, 1R. As shown in FIG. 1, in the electric power-assisted steering system 110, the turning movement of the steering wheel 3 causes the rack shaft 8 to reciprocately move in the vehicle width direction, which allows the tie rods 9, 9 to rotate, thereby to change the neutral positions of the front wheels 1L, 1R relative to the straight direction, so that the traveling direction of the four-wheel vehicle 1 can be changed.

As shown in FIG. 2, the electric power-assisted steering system 110 includes the motor 4 for supplying assisted steering force to reduce a driver's steering effort on the steering wheel 3. The worm gear 5a provided on the output shaft of the motor 4 is meshed with the worm wheel gear 5b provided on the pinion shaft 7, and the worm gear 5a and the worm wheel gear 5b constitute a deceleration mechanism.

As such, the rotator of the motor 4, and the worm gear 5a and the worm wheel gear 5b that are coupled to the rotor of the motor 4, the pinion shaft 7, and the rack shaft 8 having the rack gear 8a and the tie rods 9, 9 constitute the steering system. The motor 4 may be, for example, a three-phase brushless motor, and converts electric energy into mechanical energy by using electromagnetic induction, and applies assisted steering force for assisting a driver to handle the steering wheel 3.

The electric power-assisted steering system 110 includes the motor drive circuit 23 that drives the motor 4, the resolver 25 for detecting rotation angle of the motor 4, the torque sensor $S_T$ for detecting pinion torque that is applied to the pinion shaft 7, the steering angle sensor $S_H$ for detecting steering angle $\theta_H$ and steering angle speed $\omega_H$ of the steering wheel 3 based on rotation of the slot disk (not shorn) which is installed on the main steering shaft 3a, and the differential amplifier circuit 21 for amplifying output from the torque sensor $S_T$. Note that the configuration of the electric power-assisted steering system 110 is not always limited to the above configuration.

<Steering Control ECU 130>

Figure 5:
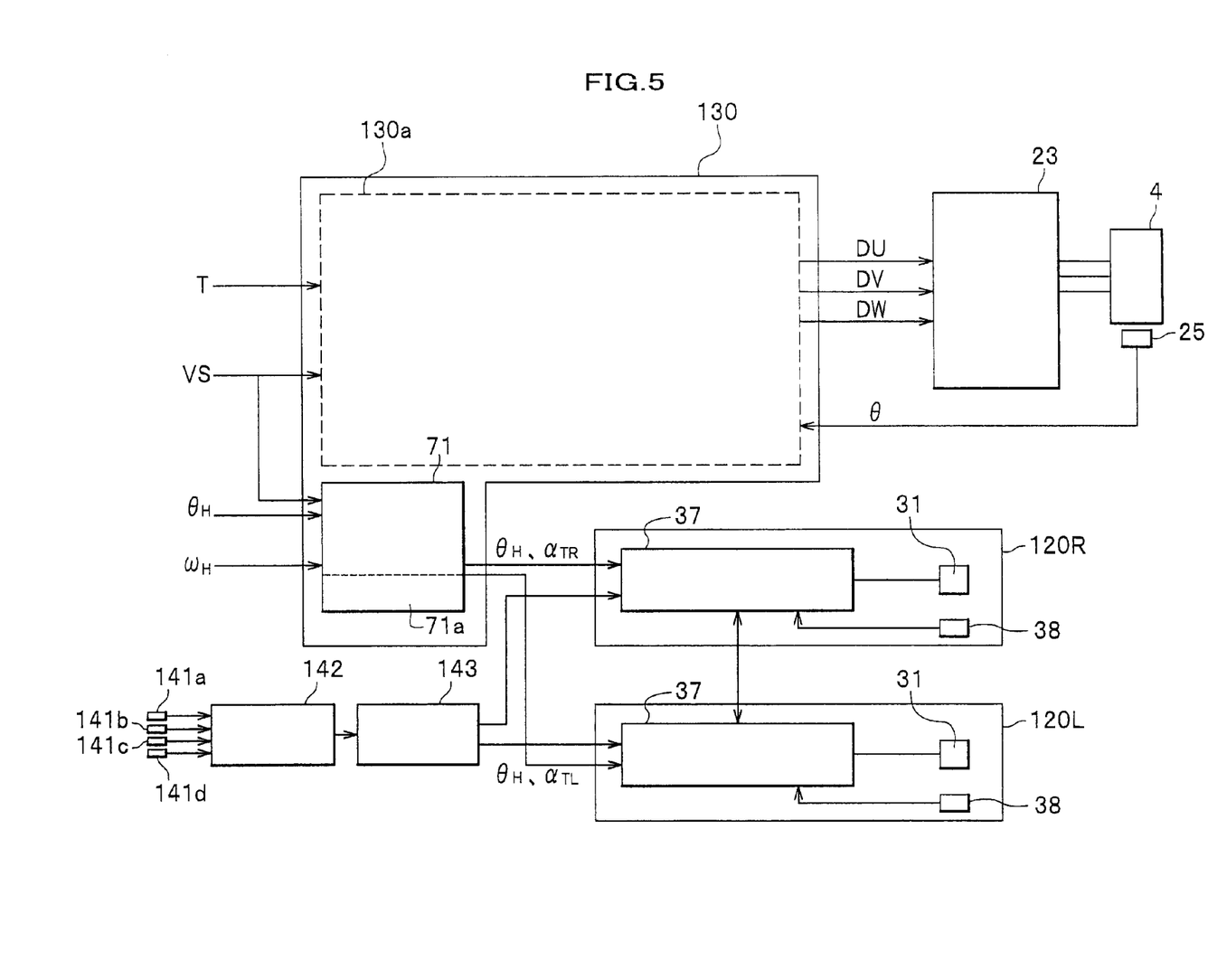
FIG. 5 is a schematic diagram showing an outline of control functions of a steering control ECU and a toe angle change control ECU 37 according to the present embodiment.

The steering control ECU 130 of the steering system 100 shown in FIG. 1 includes the electric power-assisted steering control unit 130a (described later, see FIG. 5) that provides drive control of the motor that is a drive source of the electric power-assisted steering system 110. FIG. 5 is a schematic diagram showing an outline of the control functions of the steering control ECU 130 and the toe angle change control ECUs 37 serving as a right-left toe angle separately control unit of the steering system 100 according to the present embodiment.

The motor drive circuit 23 shown in FIGS. 1 and 2 may include plural switching elements such as three-phase EFT bridge circuits, and generates rectangular wave voltage using DUTY (DU, DV, DW) signals from the electric power-assisted steering control unit 130a (see FIG. 5), so as to drive the motor 4. The motor drive circuit 23 has a function to detect three-phase motor current using hall elements not shown.

Various functions of the steering control ECU 130 will be described later when explaining controls on the electric power-assisted steering system 110 and on the toe angle change units 120L, 120R at the same time.

Toe Angle Change Units 120L, 120R>

Figure 3:
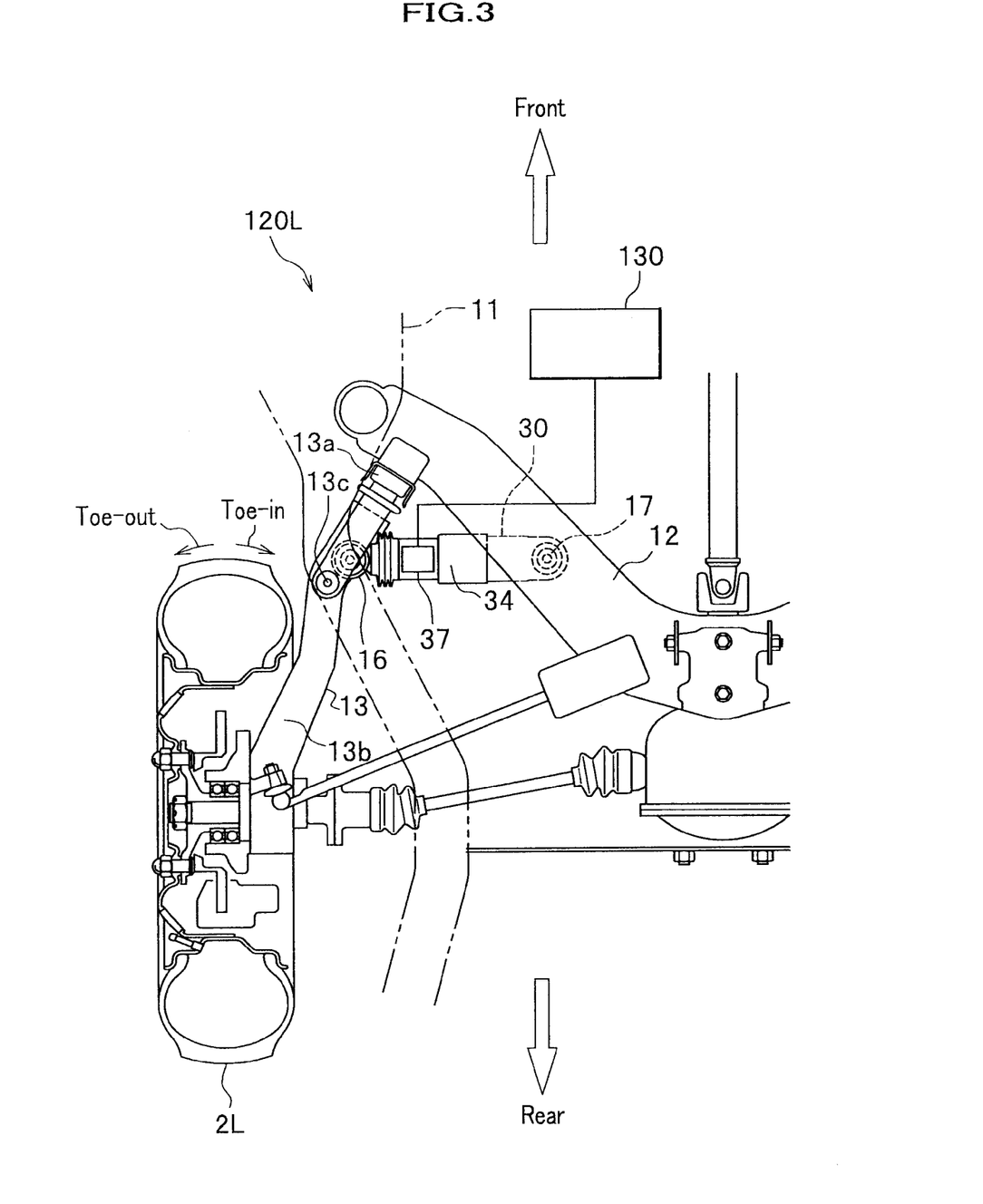
FIG. 3 is a plan view including a partial cross section view of a toe angle change unit of a left rear wheel according to the present embodiment.
Figure 4:
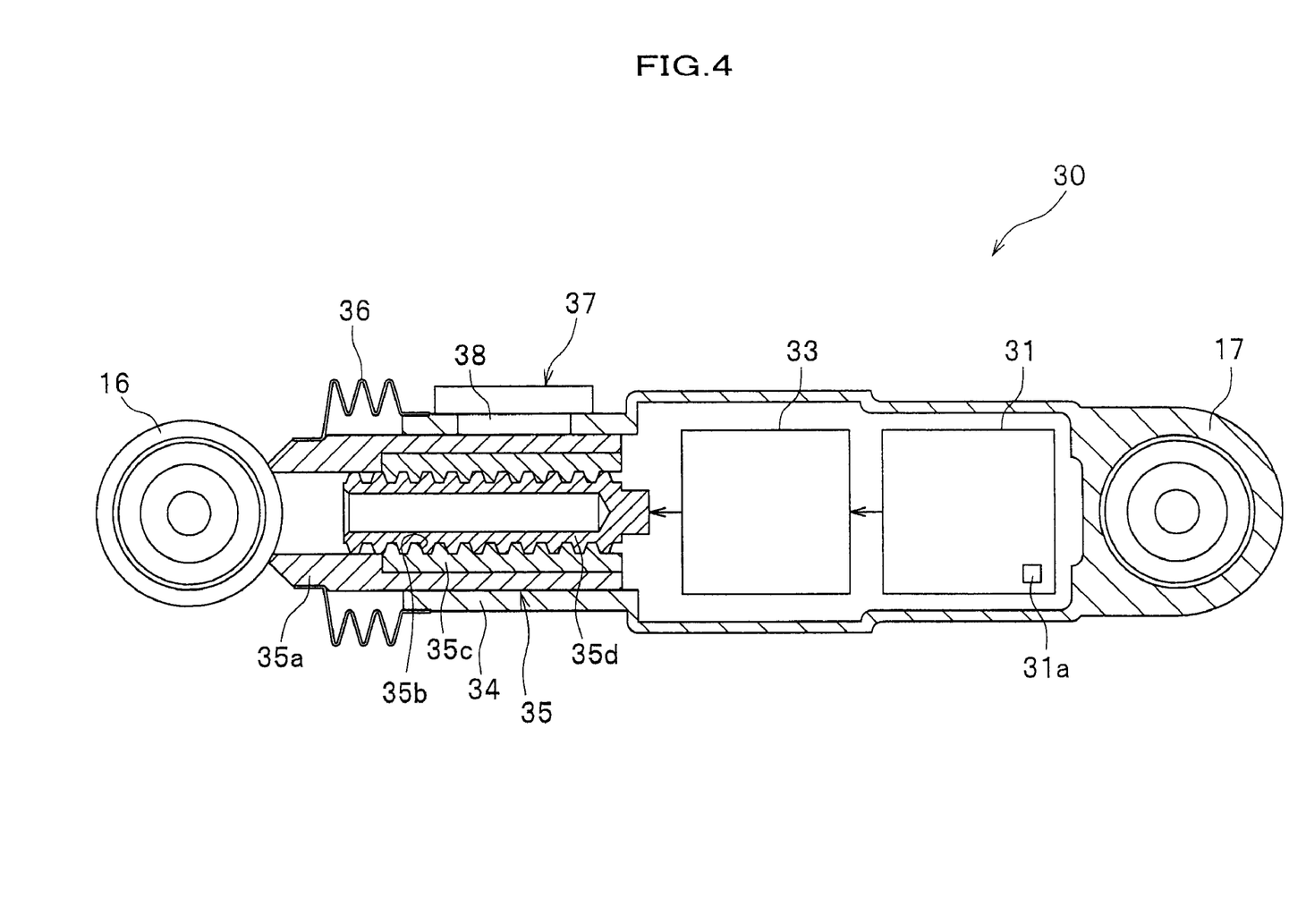
FIG. 4 is a schematic longitudinal section view showing a structure of an actuator of the toe angle change unit according to the embodiment.

With reference to FIGS. 3 and 4, descriptions will be provided on the toe angle change units 120L, 120R.

FIG. 3 is a plan view including a partial cross section view of the toe angle change unit of the left rear wheel 2L according to the present embodiment, and FIG. 4 is a schematic longitudinal section view showing the structure of the actuator of the toe angle change unit 120L according to the embodiment.

As shown in FIG. 1, the toe angle change units 120L, 120R are respectively installed to the right and the left rear wheels 2L, 2R of the vehicle, so as to change the toe angles $\alpha_{TR}$, $\alpha_{TL}$, and FIG. 3 illustrates an example of the left rear wheel 2L, and shows the toe angle change unit 120L that changes the toe angle $\alpha_{TL}$ for the rear rear wheel 2L. As shown in FIG. 3, the toe angle change unit 120L includes the actuator 30, and the toe angle change controller (hereinafter also referred to as "toe angle change control ECU") 37.

FIG. 3 shows the left rear wheel 2L only, but the right rear wheel 2R has the toe angle change unit 120R in the same (symmetric) manner.

As shown in FIG. 3, the lateral end of the cross member 12 extending in the vehicle width direction (in the right and left direction of FIG. 3) is elastically supported to the rear side frame 11 of the vehicle body. The front end of the trailing arm 13 extending in the longitudinal direction of the vehicle body (in the up-down direction of FIG. 3) is supported in the vicinity of the lateral end of the cross member 12, and the rear wheel 2L is rotatably fixed to the rear end of the trailing arm 13 through the bearing so that the rear wheel 2L can run.

In the trailing arm 13, the vehicle-body-arm 13a that is mounted to the cross member 12, and the vehicle-wheel-arm 13b that is fixed to the rear wheel 2L are rotatably coupled to each other via the rotation shaft 13c located in the vertical direction. In such a configuration, the trailing arm 13 is configured such that the vehicle-wheel-arm 13b rotates around the rotation shaft 13c relative to the vehicle-body-arm 13a so that the trailing arm 13 can displace in the vehicle width direction, and this displacement of the trailing arm 13 in vehicle width direction enables the toe angle $\alpha_{TL}$ for setting the toe-in or toe-out orientation of the rear wheel 2L (see FIG. 1) to be changed.

As shown in FIG. 3, one end of the actuator 30 is attached via the bush 16 to the vehicle-wheel-arm 13b at its front end located in the more frontward direction than the coupling portion of the rotation shaft 13c, and the other end of the actuator 30 is attached via the bush 17 to the cross member 12.

<Actuator 30 of Toe Angle Change Unit 120L>

As shown in FIG. 4, the actuator 30 includes the motor 31, the deceleration mechanism 31 and the feed screw portion 35, etc.

The motor 31 may be a brush motor rotatable in the forward/inverse direction or may be a brushless motor, or the like. The motor 31 includes the temperature sensor 31a for detecting temperature of winding wire of the coil so that a trouble in the motor 31 can be detected, and the temperature sensor 31a sends a detected signal to the self-diagnostic unit 81d (see FIG. 8) described later of the toe angle change control ECU 37.

The deceleration mechanism 33 is constituted by combining two-step planetary gears (not shown) and the like, for example.

The feed screw portion 35 includes the rod 35a in a cylindrical shape, the nut 35c in a cylindrical shape that is inserted inside the rod 35a and has a screw groove 35b on the inner periphery face thereof, and the screw shaft 35d that is meshed with the screw groove 35d so as to movably support the rod 35a in the axial direction.

The feed screw portion 35 along with the declaration mechanism 33 and the motor 31 are housed inside the case body 34 in a long cylindrical shape. The boot 36 made of rubber material to be expandable is mounted in the vicinity of the feed screw portion 35 in the case body 34 in such a manner to cover a portion between the end of the case body 34 and an exposed end of the rod 35a, so that dusts or foreign materials can be prevented from sticking onto the outer face of the rod 35a exposed at the end of the case body 34, or prevented from coming from the outside into the inside of the case body 34.

One end of the deceleration mechanism 33 is coupled to the output shaft of the motor 31 and the other end of the deceleration mechanism 33 is coupled to the screw shaft 35d. In such a configuration, driving force from the motor 31 is transmitted via the deceleration mechanism 33 to the screw shaft 35d to rotate the screw shaft 35d, so that the rod 35a moves in the axial direction (the right and left direction of FIG. 4) relative to the case body 34, and the actuator 30 can expandably operates. With static friction from meshing between the screw shaft 35d and the screw groove 35b of the nut 35c, the toe angles $\alpha_{TL}$, $\alpha_{TR}$ for the rear wheels 2L, 2R can be constant even in a state in which the motor 31 is not driven.

The actuator 30 includes the stroke sensor 38 for detecting an expansion amount, i.e., a position of the rod 35a relative to the case body 34, and the stroke sensor 38 incorporates a magnet therein to detect change in the magnetic field so as to determine the position of the rod 35a. As such, since the position of the rod 35a is detected using the stroke sensor 38, separate detections of the toe angles $\alpha_{TL}$, $\alpha_{TR}$ for the rear wheels 2L, 2R can be done with high accuracy.

In the above configuration of the actuator 30, as show in FIG. 3, the bush 16 provided at the end of the rod 53a is rotatably coupled to the vehicle-wheel-arm 13b of the trailing arm 13, and the bush 17 provided at the base end (i.e. right end in FIG. 4) of the case body 34 is rotatably coupled to the cross member 12.

When the screw shaft 35d rotates and the rod 35a expands in the left direction of FIG. 4, the vehicle-wheel-arm 13b is pushed outward in the vehicle width direction (i.e. left direction in FIG. 4), so that the rear wheel 2L rotates in the left direction (counterclockwise direction) thereby to set the rear wheel 2L in the toe-out orientation, as shown in FIG. 3. On the other hand, when the rod 35a becomes pulled backward in the right direction in FIG. 4, the vehicle-wheel-arm 13b is pulled inward of the vehicle width direction (i.e. right direction in FIG. 3), so that the rear wheel 2L rotates in the right direction (clockwise direction) thereby to set the rear wheel 2L in the toe-in orientation, as shown in FIG. 3.

Installation of the bush 16 of the actuator 30 is not limited to the vehicle-wheel-arm 13b, but may be mounted to any position where the toe angle $\alpha_{TL}$ for the rear wheel 2L can be changed, such as to the knuckle. In the present embodiment, the toe angle change units 120L, 120R have been exemplified to be applied to an independent suspension of a semi-trailing arm type, but is not limited to this and may be applied to suspensions of other types.

For example, the toe angle change units 120L, 120R may be embodied by being incorporated in respective side rods of a double wishbone type suspension or in respective side rods of a strut-type suspension.

As shown in FIG. 4, the toe angle change control ECU 37 is integrally mounted to the actuator 30. The toe angle change control ECU 37 is fixed to the case body 34 of the actuator 30, and is connected via connectors or the like to the stroke sensor 38 and the temperature sensor 31a. As shown in FIG. 1, the right and the left toe angle change control ECUs 37 are electrically connected to each other, and the angle change control ECUs 37 and the steering control ECU 130 (see FIG. 3) are electrically connected to each other, as well.

The toe angle change control ECUs 37 are supplied with power from a not-shown battery, etc., installed in the vehicle, and the steering control ECU 130 and the motor drive circuit 23 (see FIG. 1 and FIG. 5) are supplied with power from a battery, etc., in a system other than the system of toe angle change control ECUs 37.

<<Functions of Steering Control ECU 130>>

With reference to FIG. 5, descriptions will be provided on the functions of the steering control ECU 130.

The steering control ECU 130 includes a microcomputer including a CPU (Central Processing Unit), ROM (Read Only Memory), RAM (Random Access Memory), etc., and peripheral circuits, etc.

As shown in FIG. 5, the steering control ECU 130 includes the electric power-assisted steering control unit 130a that controls the electric power-assisted steering system 110 and the toe angle calculation unit 71 that calculates the toe angles $\alpha_{TL}$, $\alpha_{TR}$ (see FIG. 1) for the rear wheels 2L, 2R.

<Electric Power-Assisted Steering Control Unit 130a>

The electric power-assisted steering control unit 130a generates the target current signal to control the driving of the motor 4 as shown in FIG. 2 of JP 2002-59855 A, and adds inertia correction and damping correction to the signal, and gives feed-back control on output current from the motor drive circuit 23 by using the corrected target current, thereby to output a DUTY (DU, DV, DW) signal to the motor drive circuit 23.

<Toe Angle Calculation Unit 71>

With reference to FIG. 5, descriptions will be provided on the toe angle calculation unit 71 for calculating the toe angles $\alpha_{TL}$, $\alpha_{TR}$ that are the rear control angles.

As shown in FIG. 5, the toe angle calculation unit 71 generates the toe angles $\alpha_{TL}$, $\alpha_{TR}$ that are the rear control angle for the right and the left rear wheels 2L, 2R based on the vehicle speed signal VS representing the vehicle speed, the steering angle $\theta_H$ and the steering angle speed $\omega_H$ of the steering wheel 3, etc., and inputs the toe angles $\alpha_{TL}$, $\alpha_{TR}$ to the toe angle change control ECUs 37, 37 that control the respective toe angle changes for the right and the left rear wheels 2L, 2R.

Figure 6:
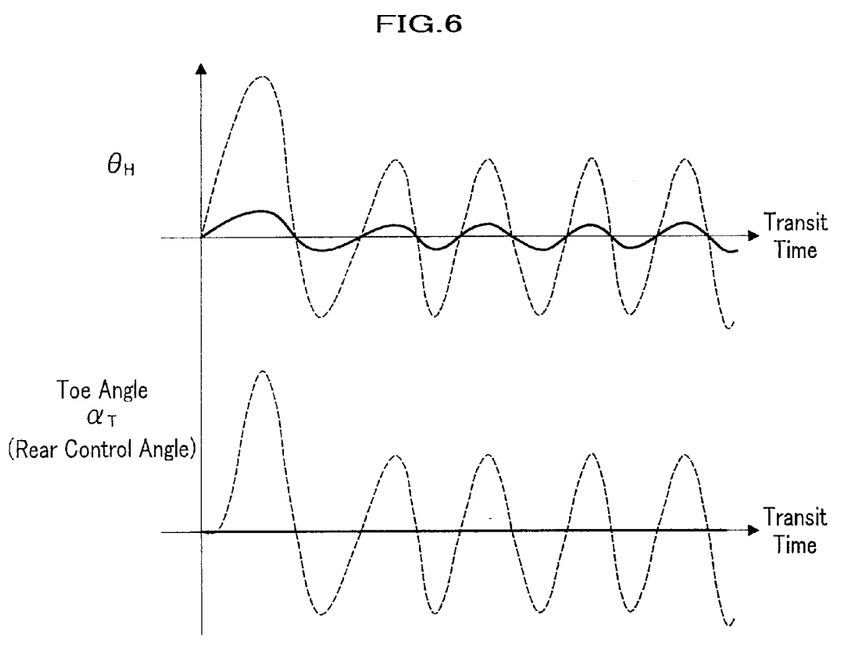
FIG. 6 is a diagram showing a relation between a magnitude of a steering angle of a steering wheel and a toe angle for a rear wheel according to the present embodiment, and an upper graph represents change in steering angle of the steering wheel relative to the transit time, and the lower graph represents change in the toe angle relative to the transit time.
Figure 7:
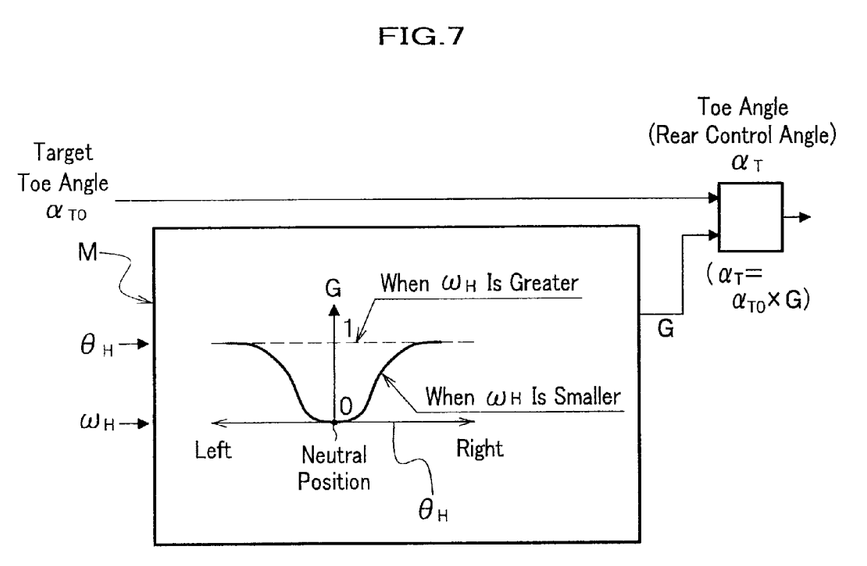
FIG. 7 is a diagram showing relation among the toe angle to be actually applied to the rear wheels, the gain used for obtaining the toe angle, and the target toe angle, and illustrates a gain map representing relation of the gain relative to the steering angle and the steering angle speed of the steering wheel according to the present embodiment.

The toe angle $\alpha_T(\alpha_{TL}, \alpha_{TR})$ is generated by referring to the toe angle table 71a that is previously prepared for the right and the left rear wheels 2L, 2R based on the steering angle $\theta_H$ and the steering angle speed $\omega_H$ of the steering wheel 3 and the vehicle speed represented by the vehicle speed signal VS, etc., so as to obtain the target toe angle $\alpha_{T0}$, and then the target toe angle $\alpha_{T0}$ is multiplied by the gain G, as described later (see FIG. 7). FIG. 6 shows the relation between the steering angle $\theta_H$ of the steering wheel 3, and the toe angle $\alpha_T$ ($\alpha_{TL}$, $\alpha_{TR}$) that is the rear control angle regarding the toe-in or toe-out orientation for the rear wheels 2R, 2L, in which the horizontal axis represents the transit time. The upper graph of FIG. 6 represents change in the steering angle $\theta_H$ of the steering wheel 3 relative to the transit time, in which the vertical axis represents the steering angle $\theta_H$ of the steering wheel 3, and the lower graph of FIG. 6 represents change in the toe angle $\alpha_T$ relative to the transit time, in which the vertical axis represents the toe angle of the rear wheels 2R, 2L.

If the steering angle $\theta_H$ of the steering wheel 3, indicated in a broken line in the upper graph of FIG. 6, is greater, the toe angle for the rear wheels 2R, 2L indicated in a broken line in the lower graph of FIG. 6 is controlled at a greater degree. Hence, when the vehicle is cornering at a lower speed, either inner wheel of the rear wheels 2R, 2L is set to have the toe angle $\alpha_T$ with a greater toe-out orientation, and the other outer wheel of the rear wheels 2R, 2L is set to have the angle $\alpha_T$ with a greater toe-in orientation, thereby to enhance the cornering performance. On the other hand, when the steering angle $\theta_H$ of the steering wheel 3 indicated in a solid bold line in the upper graph of FIG. 6 is very small, the toe angle $\alpha_T$ for the rear wheels 2R, 2L indicated in a solid bold solid line in the lower graph of FIG. 6 is controlled at a very small degree, which is almost zero.

For example, in the case where the four-wheel vehicle 1 whose steering angle $\theta_H$ of the steering wheel 3 is very small is running straightly (indicated in the solid bold line in the upper graph of FIG. 6), the rear control angle β for the rear wheels 2R, 2L is controlled to be approximately zero (indicated in the solid bold line in the lower graph of FIG. 6) in order to prevent wamble of the vehicle.

FIG. 7 shows relation among the toe angle $\alpha_T$ to be actually applied to the rear wheels 2L, 2R, the gain G used for obtaining this toe angle $\alpha_T$, and the target toe angle $\alpha_{T0}$ obtained from the toe angle table 71a, and also conceptually illustrates the gain map M representing the magnitude of the gain G relative to the steering angle $\theta_H$ and the steering angle speed $\omega_H$ of the steering wheel 3; where $\alpha_T$(toe angle to be actually applied: steering control amount for rear wheels)=$\alpha_{T0}$(target toe angle)×$G$ (gain).

As indicated in the solid bold line in the gain map M of FIG. 7, when the steering angle speed $\omega_H$ of the steering wheel 3 is greater, that is, when a driver turns the steering wheel 3 quickly, the gain is set to be 1 as indicated in the broken line. Hence, when the driver turns the steering wheel 3 quickly, the toe angle $\alpha_T$ that is the rear angle for the rear wheels 2R, 2L is set as follow:

$$\alpha_T = \alpha_{T0} \times G = \alpha_{T0} \times 1 = \alpha_{T0}$$

Therefore, the toe angle $\alpha_T$ is not set to be zero even when the steering angle $\theta_H$ of the steering wheel 3 comes to the neutral position, thus is not significantly changed regardless of the steering angle $\theta_H$ (see FIG. 7), so that the rear wheels 2R, 2L are controlled to have the toe angle $\alpha_T$ even at the neutral position of the steering wheel 3 when the driver turns the steering wheel 3 quickly, thereby to maintain continuity of the toe angle $\alpha_T$, which prevents unpleasant feeling for a driver during his or her driving.

To the contrary, when the steering angle speed $\omega_H$ of the steering wheel 3 is smaller as indicated in the solid line of the gain map M of FIG. 7, that is, when a driver turns the steering wheel 3 more slowly, the gain G is set to be zero when the steering angle $\theta_H$ of the steering wheel 3 comes in the vicinity of the neutral position. Then, as the steering angle $\theta_H$ of the steering wheel 3 is getting away from the neutral position and becoming greater, that is, as a driver is turning the steering wheel 3 toward the right or the left significantly, the gain is set to gradually become 1.

At this time, since the relation is $\alpha_T = \alpha_{T0} \times G$, when the steering angle $\theta_H$ of the steering wheel 3 is in the vicinity of the neutral position (zero), the toe angle $\alpha_T$ that is the rear control angle becomes in the relation: $\alpha_T = \alpha_{T0} \times 0 = 0$; therefore, the rear wheels 2R, 2L is controlled to have no toe angle $\alpha_T$. As shown in the gain map of FIG. 7, as the steering angle $\theta_H$ of the steering wheel 3 is getting away from the neutral position of zero, the rear wheels 2L, 2R are controlled to gradually have the toe angle $\alpha_T$ in the relation: $\alpha_T = \alpha_{T0} \times G = \alpha_{T0} \times 1 = \alpha_{T0}$. In this case, since turning the steering wheel 3 slowly, a drive does not sensitively feel whether or not the rear wheels 2R, 2L have the toe angle $\alpha_T$, so that the driver does not feel unpleasant feeling.

<Toe Angle Change Control ECU 37>

With reference to FIG. 8, descriptions will be provided on the toe angle change control ECU 37. FIG. 8 is a block diagram showing the control functions of the toe angle change control ECU 37 in the toe angle change units 120L 120R according to the present embodiment.

As shown in FIG. 8, each toe angle change control ECU 37 has a function to provide drive control on the motor 31 that drives the actuator 30 (see FIG. 1, FIG. 3), and includes the control unit 81 and the motor drive circuit 83. As shown in FIG. 1, each of the toe angle change control ECUs 37 on the right and the left is coupled to the steering control ECU 130 via the communication line, and either of the toe angle change control ECUs 37 is coupled to the other toe angle change control ECU 37 via the communication line.

The control unit 81 may be constituted by a micro computer including CPU, RAM and ROM, etc., and other peripheral circuits, etc., and also includes the target current calculation unit 81a, the motor control signal generation unit 81c and the self-diagnostic unit 81d. One of the target current calculation units 81a in the toe angle change control ECU 37 for the right rear wheel 2R calculates the target current signal based on the vehicle speed signal VS representing the vehicle speed, the steering angle $\theta_H$ of the steering wheel 3, the toe angle $\alpha_{TR}$ for the rear wheel 2R that are input via the communication line from the steering control ECU 130, and the current toe angle $\alpha_R$ for the rear wheel 2R obtained from the stroke sensor 38, and outputs this calculated target current signal to the motor control signal generation unit 81c.

The other target current calculation unit 81a of the toe angle change control ECU 37 on the left rear wheel 2L calculates the target current signal based on the vehicle speed signal VS, the steering angle $\theta_H$ of the steering wheel 3, the toe angle $\alpha_{TL}$ for the rear wheel 2L that are input via the communication line from the steering control ECU 130, and the current toe angle $\alpha_L$ for the rear wheel 2L obtained from the stroke sensor 38, and outputs this calculated target current signal to the motor control signal generation unit 81c.

The target current signal denotes a current signal required for setting the actuator 30 to have a desired operational amount at a desired speed, that is, to have a desired expansion/contraction amount to make the rear wheels 2L, 2R have desired toe angles $\alpha_{TL}$, $\alpha_{TR}$ for the rear wheels 2L, 2R. As such, the current toe angles $\alpha_R$, $\alpha_L$ are fed back to the desired toe angles $\alpha_{TR}$, $\alpha_{TL}$ in the target current calculation units 81a so as to correct the target current signals; that is, variations in the current values required for steering the rear wheels 2L, 2R due to the vehicle peed, road environment, moving condition of the vehicle and abrasion state of the tires are fed back, so that the desired toe angles $\alpha_{TL}$, $\alpha_{TR}$ can be controlled at a desired toe angle change speed.

The target current from the target current calculation unit 81a is input to the motor control signal generation unit 81c, which outputs the motor control signal to the motor drive circuit 83. The motor control signal is a signal that includes a current value to be supplied to the motor 31 and an orientation of the current. The motor drive circuit 83 includes a FET (Field Effect Transistor) bridge circuit, etc., and supplies motor current to the motor 31 based on the motor control signal.

In addition, as shown in FIG. 8, the self-diagnostic unit 81d determines whether or not any abnormality is detected based on the a position signal from the stroke sensor 38 (see FIG. 4, FIG. 5) in either of the toe angle change units 120L and 120R to which the self-diagnostic unit 81d itself belongs, a detection signal from a hole element of the motor drive circuit 83, a temperature signal from the temperature sensor 31a (see FIG. 4) and a status monitoring of the target current calculation unit 81a, and feeds back the above determined result to the target current calculation unit 81a.

<<Calculation of Toe Angle $\alpha_T$ for Rear Wheels 2L, 2R in Accordance with Steering Angle $\theta_H$ and Steering Angle Speed $\omega_H$>>

Next, descriptions will be provided on a flow of the calculation process of the toe angle $\alpha_T$ for the rear wheels 2R, 2L in accordance with the steering angle $\theta_H$ and the steering angle speed $\omega_H$ of the steering wheel 3 whose outline has been explained with reference to FIG. 7.

Figure 9:
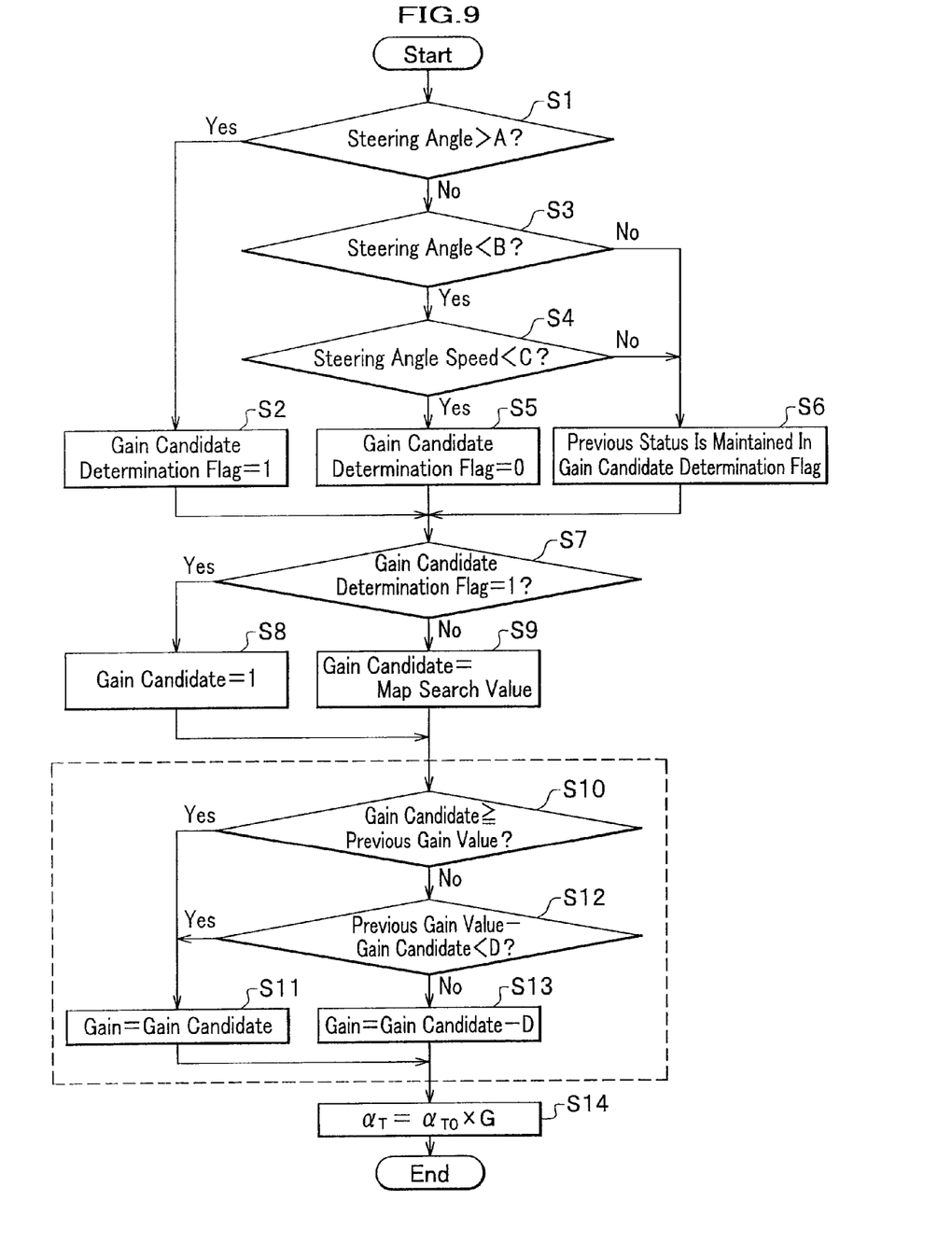
FIG. 9 is a flow chart showing a flow of the calculation process of the toe angle for the rear wheels in accordance with the steering angle and the steering angle speed of the steering wheel.

FIG. 9 is a flow chart showing a flow of the calculation process of the toe angle $\alpha_T$ for the rear wheels 2R, 2L in accordance with the steering angle $\theta_H$ and the steering angle speed $\omega_H$ of the steering wheel 3, and the steps of the process surrounded by the broken line of FIG. 9 represents a process for preventing rapid change in the gain G (see FIG. 7) that affects the toe angle $\alpha_T$.

The calculation of the toe angle $\alpha_T$ is executed by the toe angle calculation unit 71 of the steering control ECU 130, and the main task of this calculation is to find, in accordance with the steering angle $\theta_H$ and the steering angle speed $\omega_H$ of the steering wheel 3, the gain G to be multiplied by the target toe angle $\alpha_{T0}$ that is obtained from the toe angle table 71a.

As shown in FIG. 9, it is determined whether or not the steering angle $\theta_H$ of the steering wheel 3 is greater than the predetermined value A (S1 of FIG. 9). Now, the predetermined value A may be a threshold value such as 30 degree or so, equivalent to a steering condition of cornering from a straight driving or the like.

At S1 of FIG. 9, when it is determined that the steering angle $\theta_H$ of the steering wheel 3 is greater than the predetermined value A (Yes at S1 of FIG. 9), "1" is set in the gain candidate determination flag (S2 of FIG. 9).

To the contrary, at S1 of FIG. 9, when it is determined that the steering angle $\theta_H$ of the steering wheel 3 is not greater than the predetermined value A (No at S1 of FIG. 9), it is determined whether or not the steering angle $\theta_H$ of the steering wheel 3 is smaller than the predetermined value B at S3 of FIG. 9.

Now, the predetermined value B may be a threshold value such as 10 to 15 degree or so, equivalent to a steering condition of slightly turning the steering wheel 3 during a straight driving or the like.

At S3 of FIG. 9, when it is determined that the steering angle $\theta_H$ of the steering wheel 3 is not smaller than the predetermined value B (No at S3 of FIG. 9), the process proceeds to S6 of FIG. 9.

To the contrary, at S3 of FIG. 9, when it is determined that the steering angle $\theta_H$ of the steering wheel 3 is smaller than the predetermined value B (Yes at S3 of FIG. 9), it is determined whether or not the steering angle speed $\omega_H$ of the steering wheel 3 is smaller than the predetermined value C at S4 of FIG. 9. Now, the predetermined value C may be a threshold value to determine whether or not a driver feel unpleasant feeling when the toe angle $\alpha_T$ for the rear wheels 2R, 2L is set to be zero in the vicinity of the neutral position of the steering wheel 3 while turning the steering wheel 3 significantly from the right to the left, for example, and this threshold value may be appropriately set in accordance with various driving conditions. At S4 of FIG. 9, when it is determined that the steering angle speed $\omega_H$ of the steering wheel 3 is smaller than the predetermined value C (Yes at S4 of FIG. 4), then "0" is set in the gain candidate determination flag (see S5 of FIG. 9).

To the contrary, when it is determined that the steering angle speed $\omega_H$ of the steering wheel 3 is not smaller than the predetermined value C (No at S4 of FIG. 4), the previous status is maintained in the gain candidate determination flag. For example, if "1" was set in the gain candidate determination flag at the previous time, "1" is maintained in the gain candidate determination flag; or if "0" was set in the gain candidate determination flag at the previous time, "0" is maintained in the gain candidate determination flag. Accordingly, continuation of the toe angle $\alpha_T$ set at the previous time can be maintained, thereby to reduce rapid change of the toe angle $\alpha_T$.

Through the steps of the process from S1 to S6 of FIG. 9, once "1" is set in the gain candidate determination flag when the steering wheel 3 is turned significantly (see S1, S2 of FIG. 9), "1" is kept in the gain candidate determination flag (see S2, S6 of FIG. 9) until the steering wheel 3 is turned back to its center position and maintained to this center position (see S1 to S5 of FIG. 9), so that "1" is set in the gain candidate G0 as described later, accordingly "1" is set in the gain G (see S8, S10, S11 of FIG. 9 of FIG. 9 as described later).

Next, the steps of the process from S2, S5, S6 of FIG. 9 is shift to S7 of FIG. 9, and it is determined whether or not the gain candidate determination flag carries "1". At S7 of FIG. 9, when it is determined that the gain candidate determination flag carries "1" (Yes at S7 of FIG. 9), which means that the steering wheel 3 is significantly turned so that the steering angle $\theta_H$ of the steering wheel 3 becomes greater (see S1, S2 of FIG. 9) or that the steering speed of the steering wheel 3 is greater so that the steering speed angle $\omega_H$ becomes greater, and the like, then "1" is set in the gain candidate G0 (S8 of FIG. 9).

Figure 10:
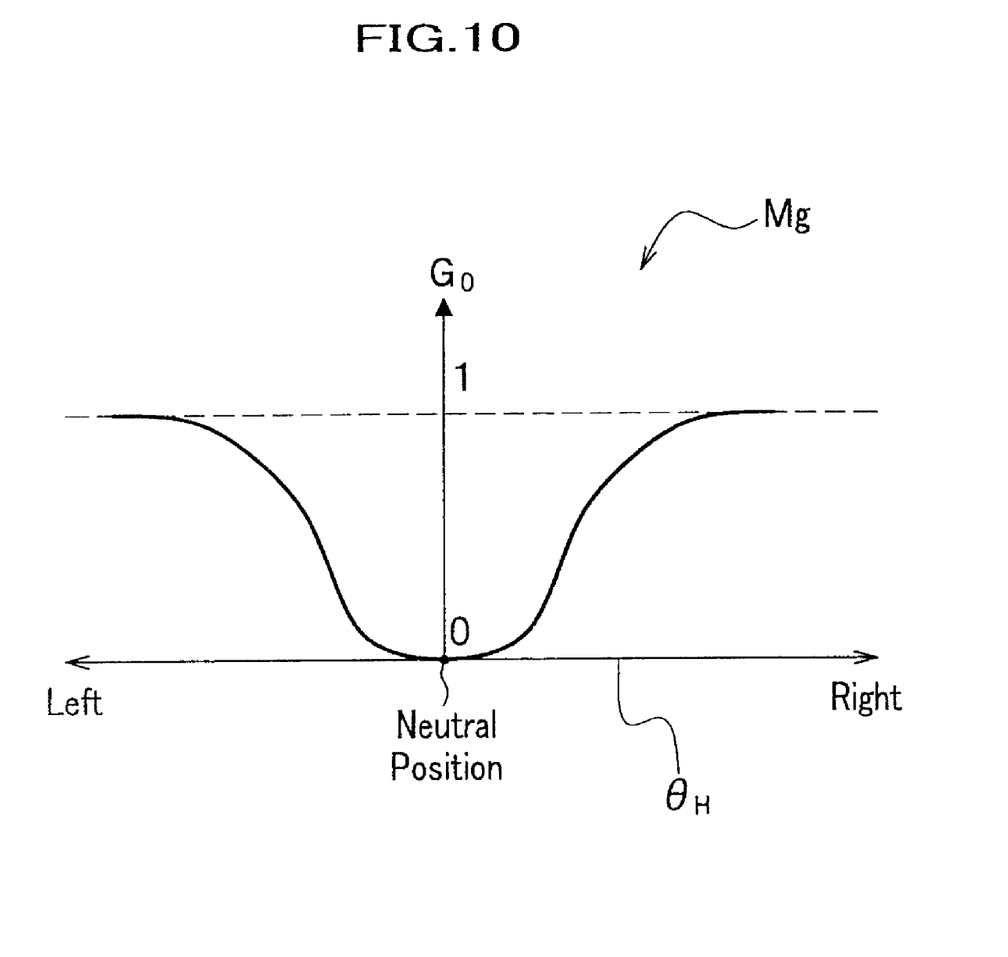
FIG. 10 shows a gain map used for the case in which the steering angle of the steering wheel 3 is smaller, representing a relation between the steering angle of the steering wheel and the gain.

If it is determined that the gain candidate determination flag does not carry "1" (No at S7 of FIG. 9), which means that the steering angle $\theta_H$ of the steering wheel 3 is smaller in the vicinity of the neutral position of the steering wheel 3 (S1, S3 of FIG. 9) and that the steering wheel 3 has a smaller steering speed so that the steering angle speed $\omega_H$ becomes smaller (S4 of FIG. 9), a map search value is set as the gain candidate G0, and this map search value is defined by searching the gain map Mg predefined for the case in which the steering angle speed $\omega_H$ of the steering wheel 3 is smaller, as shown in FIG. 10. As shown in FIG. 10, the gain candidate G0 is set to be reduced in the vicinity of the neutral position of the steering wheel 3 in accordance with the steering angle $\theta_H$ of the steering wheel 3 (S9 of FIG. 9). FIG. 10 shows the gain map Mg used for the case in which the steering angle $\theta_H$ of the steering wheel 3 is smaller, and the gain map Mg represents the relation between the steering angle $\theta_H$ of the steering wheel 3 and the gain candidate G0, where the horizontal axis represents the steering angle $\theta_H$ of the steering wheel 3 and the vertical axis represents the gain candidate G0.

Next, the process is shift to the steps of S10 to S13 to prevent rapid change of the gain G (surrounded by the broken line of FIG. 9). At S10 of FIG. 9, it is determined whether or not the gain candidate G0 is not smaller than the previous gain value that was set at the previous time. If it is determined, at S10 of FIG. 9, that the gain candidate G0 is not smaller than the previous gain value (Yes at S10 of FIG. 9), then at S11 of FIG. 9, the value in the gain candidate G0 is set as the gain G (S11 of FIG. 9).

To the contrary, when at S10 of FIG. 9 it is determined that the gain candidate G0 is smaller than the previous gain value (No at S10 of FIG. 9), then at S12 of FIG. 12, it is determined whether or not the value [previous gain value−gain candidate G0] is smaller than the predetermined value D (S12 of FIG. 9). At S12 of FIG. 9, in order to prevent rapid reduction of the toe angle $\alpha_T$ obtained by multiplying the rapidly reduced gain G, it is determined whether or not the value [previous gain value−gain candidate G0] that is a difference between the previous gain value and the gain candidate G0 is smaller than the predetermined D.

In the predetermined value D, a threshold value is appropriately set, which is a criterion for determining whether or not a driver has unpleasant feeling about change in the toe angle $\alpha_T$ at the time of driving due to the change in the gain G (see FIG. 7).

At S12 of FIG. 9, when it is determined that the value [the previous gain value−the gain candidate G0] is smaller than the predetermined value D (Yes at S12 of FIG. 9), at S11 of FIG. 9, the value set in the gain candidate G0 is set as the gain G.

To the contrary, when it is determined that the value [previous gain value−gain candidate G0] is not smaller than the predetermined value D (No at S12 of FIG. 9), the value [previous gain value−D] is set as the gain G at S13 of FIG. 9. Accordingly, even when the steering wheel 3 is rapidly turned back to the neutral position and kept at this neutral position, the reduction of the gain G from the previous gain value is limited to this predetermined value D; therefore, the rapid reduction of the gain G can be prevented, which also softens the rapid reduction of the toe angle $\alpha_T$, accordingly eliminating unpleasant feeling during driving.

Now, at S14 of FIG. 9, the gain G obtained from S11 or S13 of FIG. 9 is multiplied by the target toe angle $\alpha_{T0}$ obtained by referring to the toe angle table 71a, and then the toe angle $\alpha_T$ ($\alpha_{TL}$, $\alpha_{TR}$) that is the rear control angles regarding the toe-in and toe-out orientations for the rear wheels 2R, 2L.

As described above, there has been explained the flow of the calculation process of the toe angle $\alpha_T$ for the rear wheels 2R, 2L in accordance with the steering angle $\theta_H$ and the steering angle speed $\omega_H$ of the steering wheel 3.

In the above configuration, the gain G is provided with variable dead zone so as to control the toe angles $\alpha_{TL}$, $\alpha_{TR}$ for the rear wheels 2L, 2R in accordance with the steering angle $\theta_H$ and the steering angle speed $\omega_H$ of the steering wheel 3. Hence, even when a driver slightly swings the steering wheel 3 to the right and the left at the time of driving straightly, the rear wheels 2L, 2R are not be steered, and when the driver significantly and rapidly turns the steering wheel 3 at the time of turning back the steering wheel 3, there is not affect of the dead zone, so that the toe angles $\alpha_{TL}$, $\alpha_{TR}$ for the rear wheels 2L, 2R can be controlled in accordance with the driving conditions. Accordingly, regardless of the driving conditions, the toe angles $\alpha_{TL}$, $\alpha_{TR}$ for the rear wheels 2L, 2R can be controlled without causing unpleasant feeling thereby to realize a comfortable driving.

Since the right and the left rear wheels 2R, 2L are separately controlled, the rear wheels 2R, 2L can be controlled even at the time of cornering, etc.; accordingly flexible and various controls on the rear wheels 2R, 2L can be realized.

Since the right and the left rear wheels 2R, 2L have the respective actuators 30, the right and the left rear wheels 2R, 2L can be controlled separately using the respective actuators 30.

The steering angle $\theta_H$ of the steering wheel 3 may be determined based on the position of the rack shaft 8, and the steering angle speed $\omega_H$ may be determined based on the movement speed of the rack shaft 8.

What is claimed is:

1. A steering system that steers rear wheels of a vehicle in accordance with a steering angle of a steering wheel, wherein
when the steering angle of the steering wheel is less than a predetermined steering angle value, the steering system performs a reduction control to provide a first steering control amount for the rear wheels that is less than a second steering control amount for the rear wheels, the second steering control amount being for when the steering angle of the steering wheel is greater than the predetermined steering angle value, and wherein
when an angle speed of the steering wheel becomes greater than a predetermined angle speed value, the steering system performs no reduction control for the rear wheels even in the range where the steering angle is smaller than the predetermined steering angle value, wherein the steering system performs the reduction control to limit a rate of change in the steering control amount for the rear wheels, in which the steering control amount becomes smaller as the steering angle becomes smaller.

2. The steering system as claimed in claim 1, wherein right and left rear wheels are separately controlled.

3. The steering system as claimed in claim 2, wherein the right and the left rear wheels have respective actuators.

4. The steering system as claimed in claim 1, wherein right and left rear wheels are separately controlled.

5. The steering system as claimed in claim 4, wherein the right and the left rear wheels have respective actuators.

6. A steering system that steers rear wheels of a vehicle in accordance with a steering angle of a steering wheel, wherein
when the steering angle of the steering wheel is less than a predetermined steering angle value, the steering system performs a reduction control to provide a first steering control amount for the rear wheels that is less than a second steering control amount for the rear wheels, the second steering control amount being for when the steering angle of the steering wheel is greater than the predetermined steering angle value, and wherein when an angle speed of the steering wheel becomes greater than a predetermined angle speed value, the steering system performs the reduction control with less reduced steering control amount for the rear wheels even in the range where the steering angle is smaller than the predetermined steering angle value, wherein the steering system performs the reduction control to limit a rate of change in the steering control amount for the rear wheels, in which the steering control amount becomes smaller as the steering angle becomes smaller.

7. The steering system as claimed in claim 6, wherein right and left rear wheels are separately controlled.

8. The steering system as claimed in claim 7, wherein the right and the left rear wheels have respective actuators.

9. The steering system as claimed in claim 6, wherein right and left rear wheels are separately controlled.

10. The steering system as claimed in claim 9, wherein the right and the left rear wheels have respective actuators.

\* \* \* \* \*